United States Patent [19]

McClure, Jr.

[11] 4,365,547

[45] Dec. 28, 1982

[54] METHOD AND APPARATUS FOR CONTROLLING A PRESS

[75] Inventor: George W. McClure, Jr., Cincinnati, Ohio

[73] Assignee: Formica Corporation, Wayne, N.J.

[21] Appl. No.: 275,573

[22] Filed: Jun. 22, 1981

[51] Int. Cl.³ .............................................. B30B 15/34
[52] U.S. Cl. .................................... 100/38; 100/93 P;
    100/43; 156/359; 156/583.1; 425/143; 425/339;
    425/384; 425/407
[58] Field of Search ........................ 100/38, 93 P, 43;
    156/359, 366, 498, 583.1; 425/143, 339, 384,
    338, 406, 407

[56] References Cited

U.S. PATENT DOCUMENTS

| | | | |
|---|---|---|---|
| 2,432,215 | 12/1947 | Stocker | 100/93 P X |
| 3,348,474 | 10/1967 | Virta et al. | 100/93 P |
| 3,960,069 | 6/1976 | Bowyer | 100/38 |
| 4,140,050 | 2/1979 | Giddings | 100/93 P |

*Primary Examiner*—Peter Feldman
*Attorney, Agent, or Firm*—Frank M. Van Riet

[57] ABSTRACT

Control of a laminating press is attained by monitoring the temperature of the heating medium circulating through the press components.

5 Claims, 10 Drawing Figures

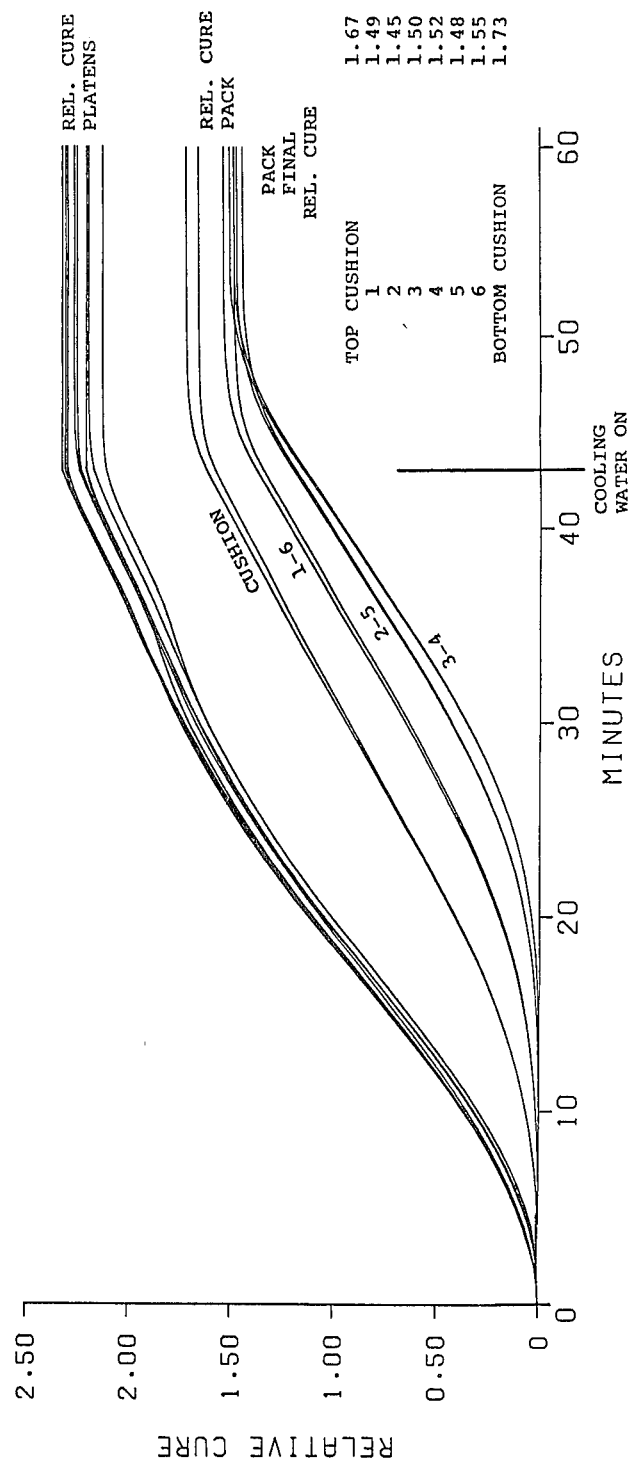

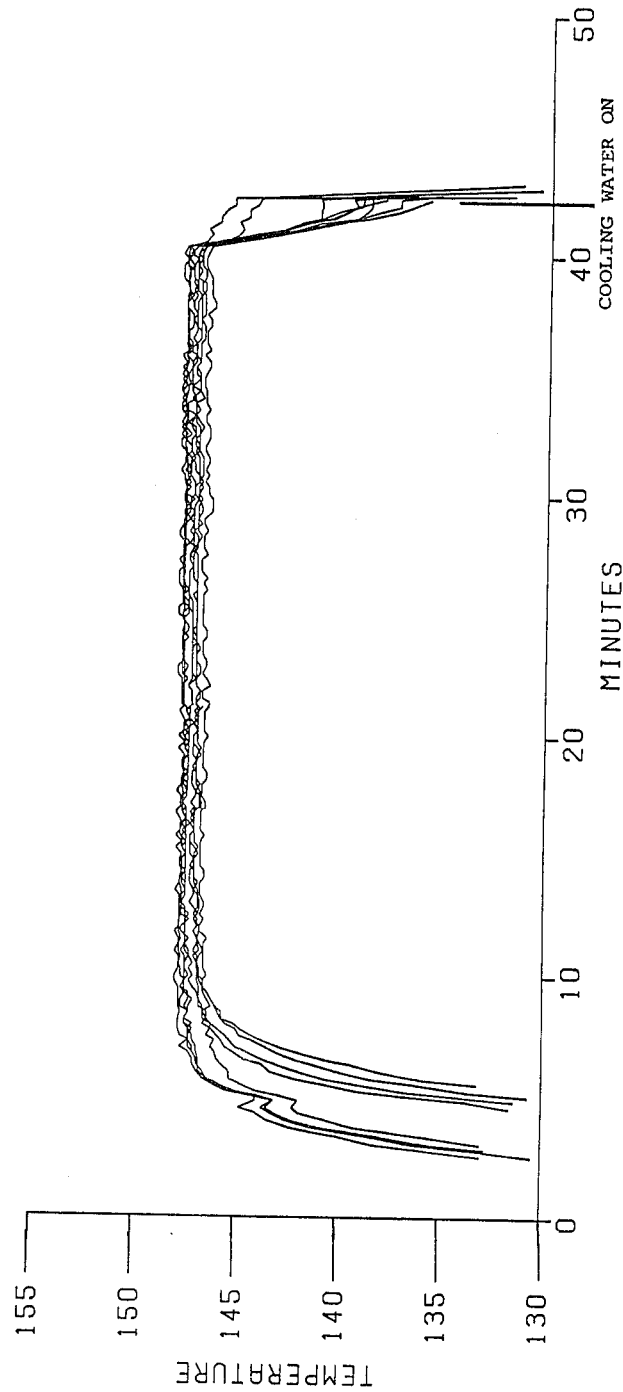

METHOD AND APPARATUS FOR CONTROLLING A PRESS

BACKGROUND OF THE INVENTION

In the production of decorative laminates, laminate assemblies composed of thermosetting phenolic resin impregnated Kraft paper core sheets, a thermosetting melamine resin impregnated decor sheet and, optionally, a thermosetting melamine resin impregnated overlay sheet are consolidated into press packs and laminated by the application of heat and pressure between the platens of a hydraulic press heated by steam, hot water or other suitable heating medium. A modern laminating press may have as many as twenty-two openings for sheet sizes up to 5 ft. × 12 ft. Since each opening can generally accommodate at least a ten-sheet pack, many laminates may be produced in each press cycle. When the pack has been placed between the press platen, pressure is applied until a net pressure in excess of 1,000 psi exists over the projected area of the sheets being laminated. With the pack under suitable pressure, the press temperature is raised by means of the fluid heating media which is introduced into the channels within the individual press platens. On a typical cycle, the temperature will rise to about 140° C. within 30 minutes, remain at this level for 10 minutes to 30 minutes to accomplish curing of the resins, and return to room temperature in another 30 minutes. Cooling is accomplished by passing a cooling fluid through the same channels which guide the heating media or by simply cooling the heating media via a heat exchanger.

The word "curing" is a term frequently misused in the plastics industry. In molding and similar operations outside of the field of high-pressure laminates, curing refers to the transition of a resin from a soluble or fusible condition to an unsoluble-infusible condition by heat, chemical action or air drying. Thus when a liquid epoxy resin, for example, is poured into a mold and allowed to harden, it is said to be cured. In the manufacture of high-pressure laminates, curing takes place under heat and pressure in the platen press, as described hereinabove. However, after the fusion of the resin is accomplished, and the resin has become thermoset, there is an additional type of curing required which is more analogous to the annealing of glass. The laminate cannot be immediately removed from the press and allowed to cool rapidly in air because embrittlement of the surface layers will occur usually accompanied by warpage or buckling. As with newly cast or molded glass, the laminates must be slowly cooled by a gradual reduction of the heat and pressure to ambient and atmospheric conditions by gradually lowering the temperature of the platens.

After the curing is complete, the packs are removed from the press, the packs are disassembled and the laminates are sent on for finishing, while the press plates are returned for the next press run.

The water remaining in the press after the laminates have been removed is "blown out" with saturated steam during the first three to five minutes of the press cycle next accomplished. The temperature and flow rates through the press are then controlled to maintain the required time-temperature.

This means of press control has caused (1) an increase in the cost because of the expenditure of substantial amounts of energy, (2) an increase in the production of non-uniform products because of temperature variations in the press, (3) increased wear and tear on the apparatus components and (4) caused condensate and contaminate blocking of the press piping.

SUMMARY

I have now discovered a new and novel improvement which overcomes the difficulties exhibited by the prior art control procedures and apparatus in the pressing of laminate assemblies. My invention permits the accurate control of the time-temperature relationship experienced by materials being cured by the heating and subsequent cooling at elevated temperatures. Particularly, press cycles run by my invention are more consistent and uniform than the prior art control cycles. Thus laminate quality and uniformity is assured at the lowest possible unit cost.

I attain these advantageous results by the application and cooperation of feedback control techniques and process control equipment, configured as a process control scheme, to the curing process achieved by heating and cooling under pressure. My invention automates and significantly improves cure cycle control.

My method is a novel scheme for control optimization of the curing in a laminate press comprising a set point programmer, a process controller with proportional integral and derivative modes of control, an event occurrence timer, interacting relays and associated automated valves employed in a novel cooperation with the heating and cooling of a press. The novel process disclosed herein is controlled by reference to the temperature of the heat transfer medium circulating through the heat exchangers of a press. When utilizing prior procedures of control, thereof times exists a critical time gap between the recordation of circulating heating medium and the temperature of the laminate assembly at a singular location. If the temperature is to be changed, a controller must first determine that a change is necessary and then determine how much of a change to make. The more efficient the controller to the needs of a singular point within the laminate to correct for deviations from the desired temperature, the more rapid are fluctuations in the temperature and flow rate of the circulating heating medium.

The greater the occurrences and magnitude of fluctuations in the flow rate of the heating medium, saturated steam, flowing through the press, the greater the disturbances to uniformity of the heat transfer throughout a press becomes, due to the uneven removal of condensate produced in elevating the laminates from an ambient entering temperature of 25°–30° C. to the required curing temperature of 130°–150° C. FIGS. 3 and 4 present the functions of a press cycle required to cure laminates to product acceptance. A press cycle commences with the circulation of steam through the heat exchangers of a press at the flow rate and pressure necessary to remove cooling water remaining in a press from a previous cycle. The steam flow utilized is the maximum available required to flush out the water over a predetermined time interval (described as the blow out or preheat period). During this period, the pressure of the entering saturated steam is not controlled, thereby allowing the contained laminate to heat up at varying rates. At the termination of this period, the temperature of the circulating heating medium is adjusted to obtain the temperature required at a singular sensed location in the laminates contained in the press. Removal of condensate formed during the heat-up to and maintenance at a top temperature is by means of steam traps. The uniformity of temperature throughout the press is dependent upon uniform flow of the condensate, a result not possible when corrective changes are being continuously made to obtain a specific temperature at a singular sensed location within the material being cured. As a result of these flow fluctuations, the press transfers heat irregularly due to condensate pocket buildups within the circulating system of the press causing the laminates contained in the press to be cured at levels of temperatures sufficiently inconsistent enough so as to cause material problems for the ultimate consumers with regards to the conditions they must employ in order to fabricate laminates into products desired.

Uniformity of cure in laminates and between laminates within the same batch and between batches is improved by controlling the temperature of the heat transfer medium to that temperature which produces the temperature of cure required for the mean mass of the laminates contained within the press rather than to adjust the transfer medium to satisfy a singular location during a press cure cycle.

My instant invention controls the temperature of the heat transfer medium circulating through a press from the commencement of the cycle, blow out and cure periods, to the termination of the cycle to meet the mean average cure required of all the laminates contained in the press. Flow movement of the heat transfer medium and the removal of condensate is uniform resulting in improved temperature uniformity throughout a press which in turn satisfies the needs of the ultimate consumer.

A. The physical inputs to the material contained in the press during the blow out, cure, blow off and cooling periods of the cycle.

B. The temperatures obtained at the same X-Y plane location in the layers of material in a singular pack contained within a press.

C. The temperature of the platens at various locations throughout the press.

D. The cure advancements of the materials at the locations of B above.

DISCUSSION OF THE PRIOR ART

Figure 1:
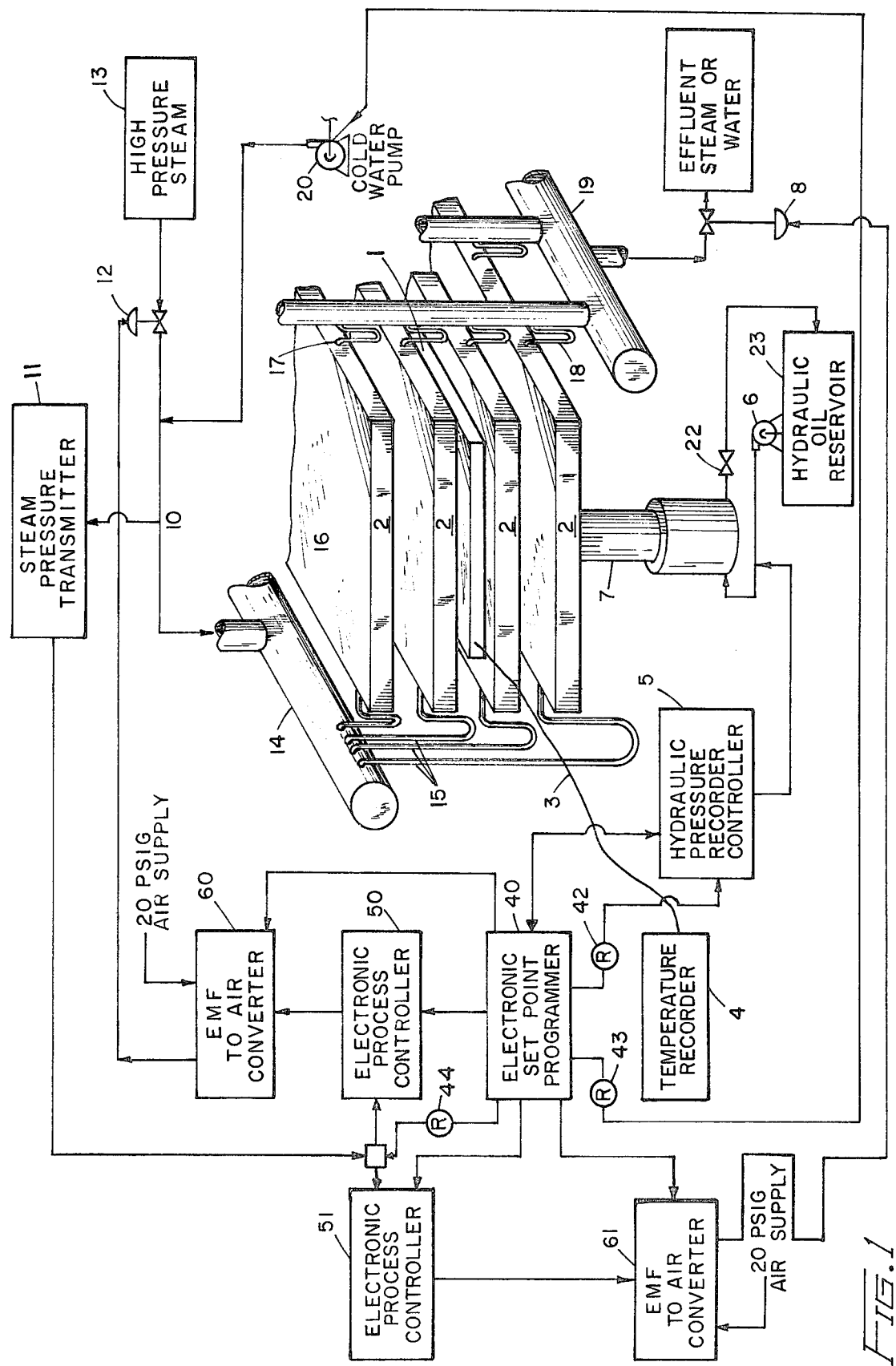
FIG. 1 is a diagrammatic view of the laminating press assembly, temperature measuring and controlling process and apparatus of the instant invention.

With reference to the drawings, specifically FIG. 1 of U.S. Pat. No. 3,960,069, hereby incorporated herein by reference, a diagrammatical view of a steam heated, water cooled laminating press and controls typically used previously is shown.

In operation, the press cycle begins with the hydraulic pressure recorder controller 5 set manually. Valve 22 is closed and pump 6 is activated to thereby pump oil from reservoir 22 to ram 7 to force the ram upward and close the press.

At the same time, effluent or by-pass valve 8 is opened, steam supply valve 9 is opened and water supply valve 10 is closed. Steam pressure control valve 12 is opened, permitting steam 13 to flow through manifold 14 which distributes the steam through the flexible piping 15 to channels 16 in the press platens 2. The steam exits the platens at 17, passes through flexible piping 18 to second manifold 19 and is discharged through valve 8.

This preliminary preheatup completely removes all water from the platens from the previous pressing within a few minutes. By-pass valve 8 is then closed.

The temperature of the pack 1, as sensed by thermocouple wire 3 and indicated by recorder 4, will gradually rise. A controller adjusts the steam pressure in the press in order to execute the desired time-temperature profile. At the end of the cure period, the press is cooled by first closing steam supply valve 12 and opening valve 8. After the pressure in the press drops, the cooling water pump 20 is started thereby forcing cold water 21 to flow through the manifold 14, piping 15, channels 16, piping 18, manifold 19 and discharge through effluent valve arrangement 8.

The equipment used in the control scheme comprises, in combination, an electronic set point programmer 40, an electronic process controller with proportional, integral and derivative modes of control 50 and an EMF to pneumatic converter 60, which equipment is described in said U.S. Pat. No. 3,960,069 and constitutes that useful in the present invention, see FIG. 2 thereof.

Figure 3A:
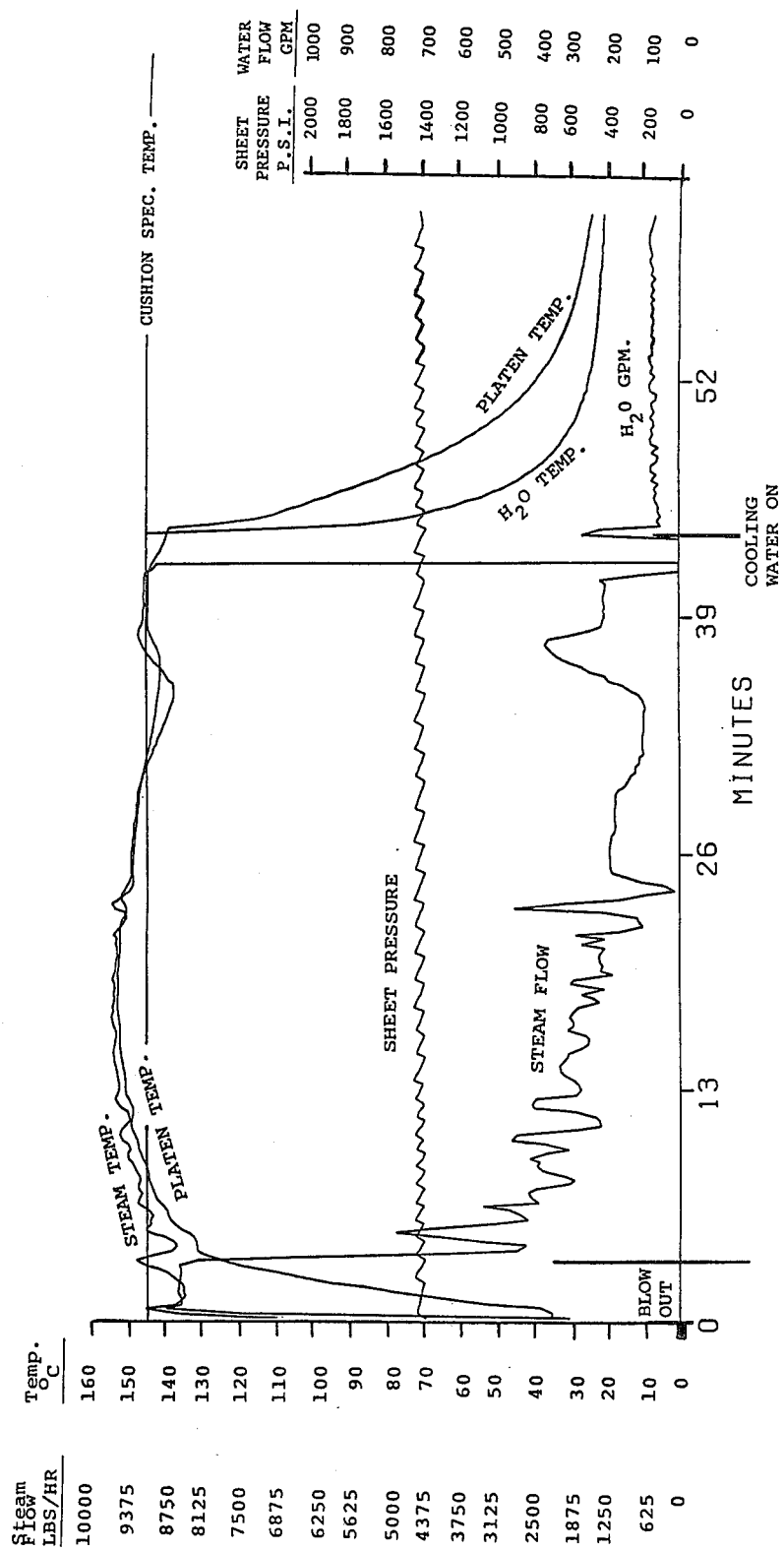
FIG. 3 presents the actual performance of the press and material controlled by the previous art, U.S. Pat. No. 3,960,069.
Figure 3B:
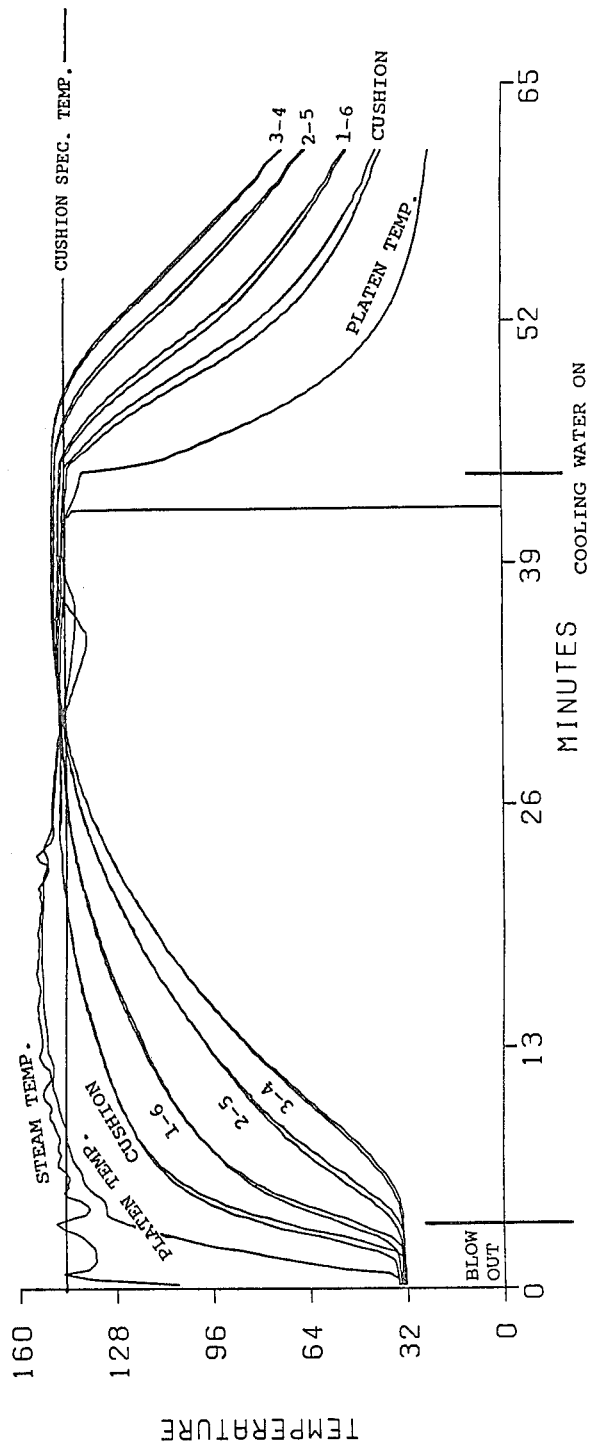
Figure 3C:
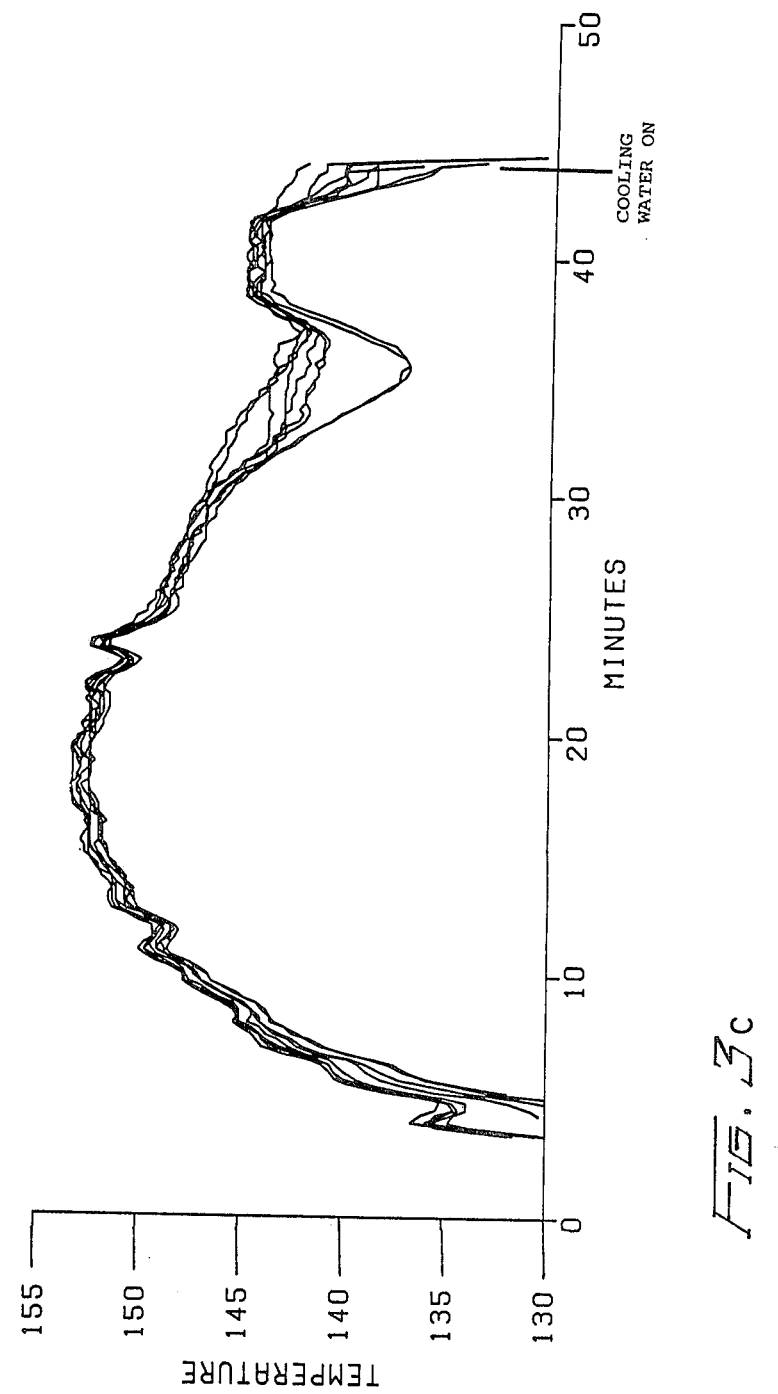
Figure 4A:
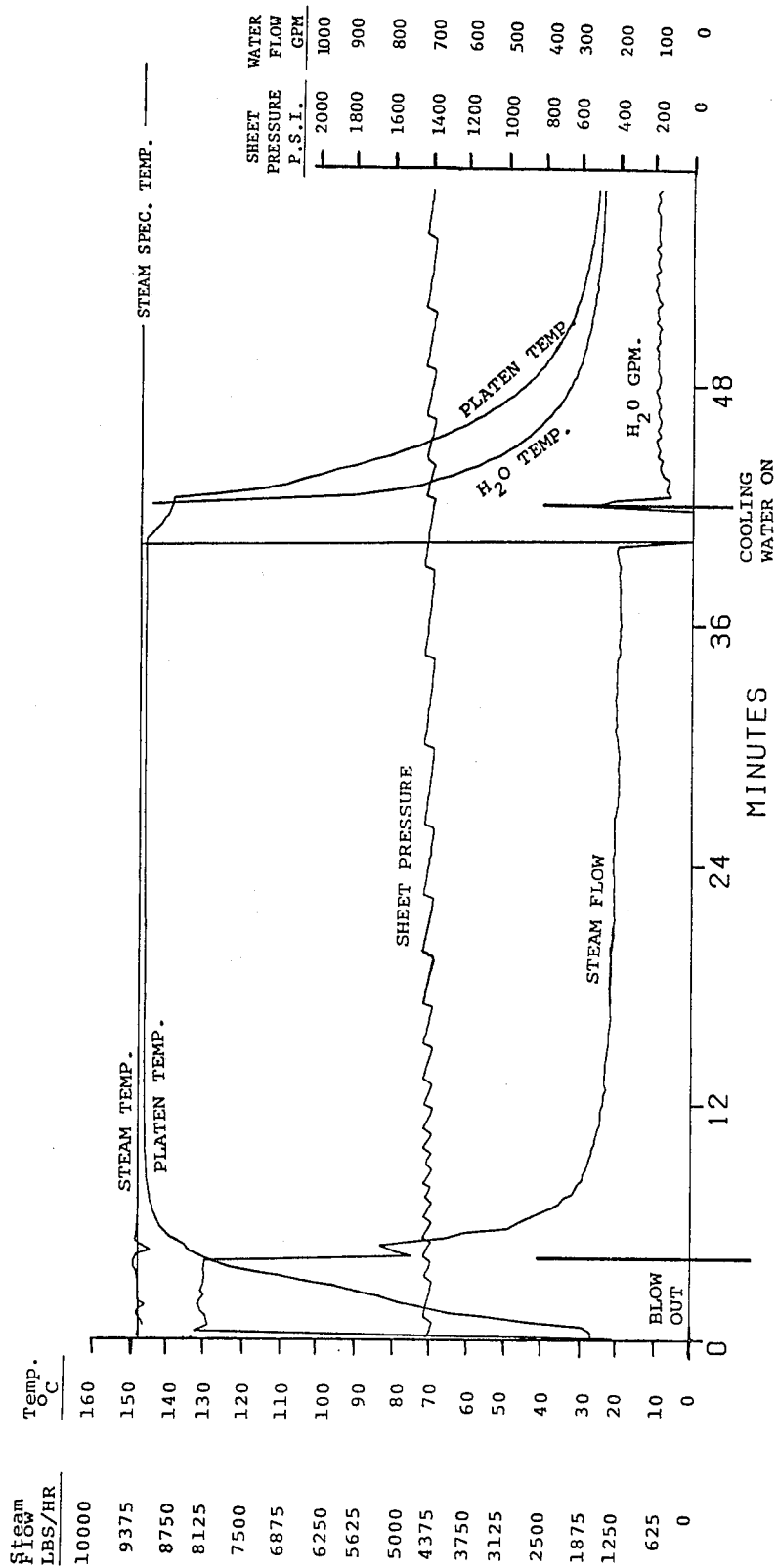
FIG. 4 presents the actual performance of the press and material controlled by the instant invention. Each presentation has four graphic plots for performance comparisons identified as follows.
Figure 4B:
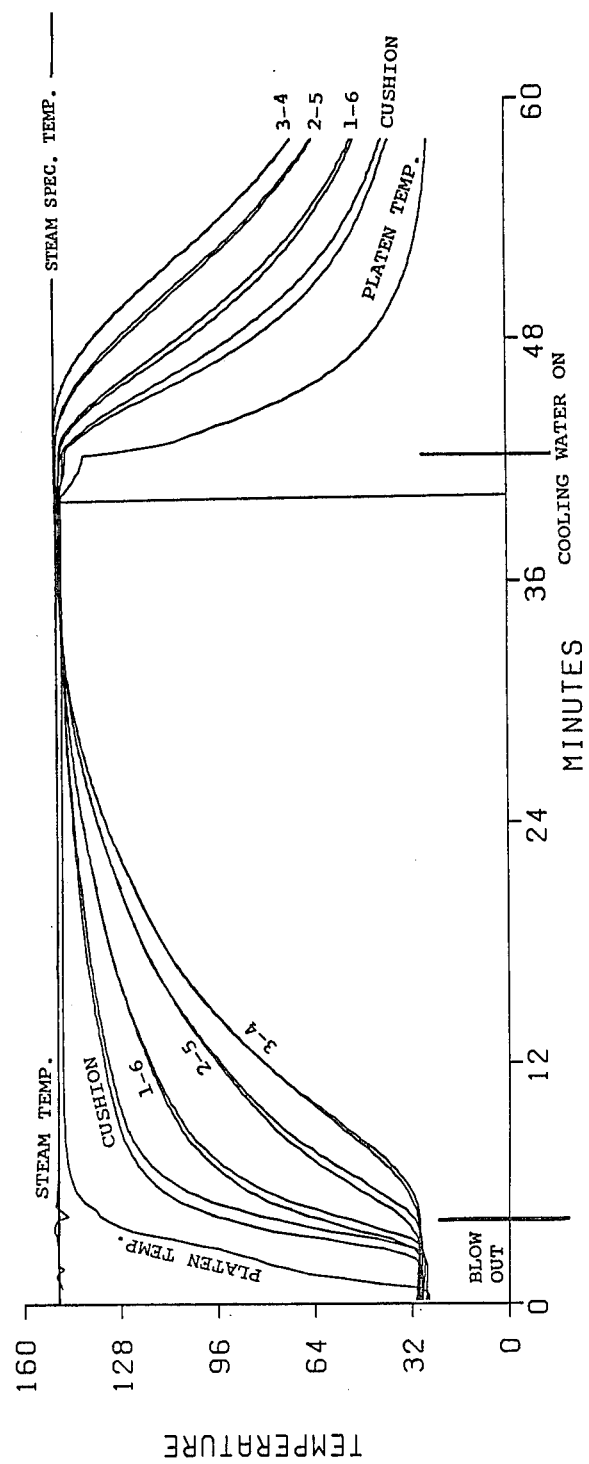
Figure 4D:
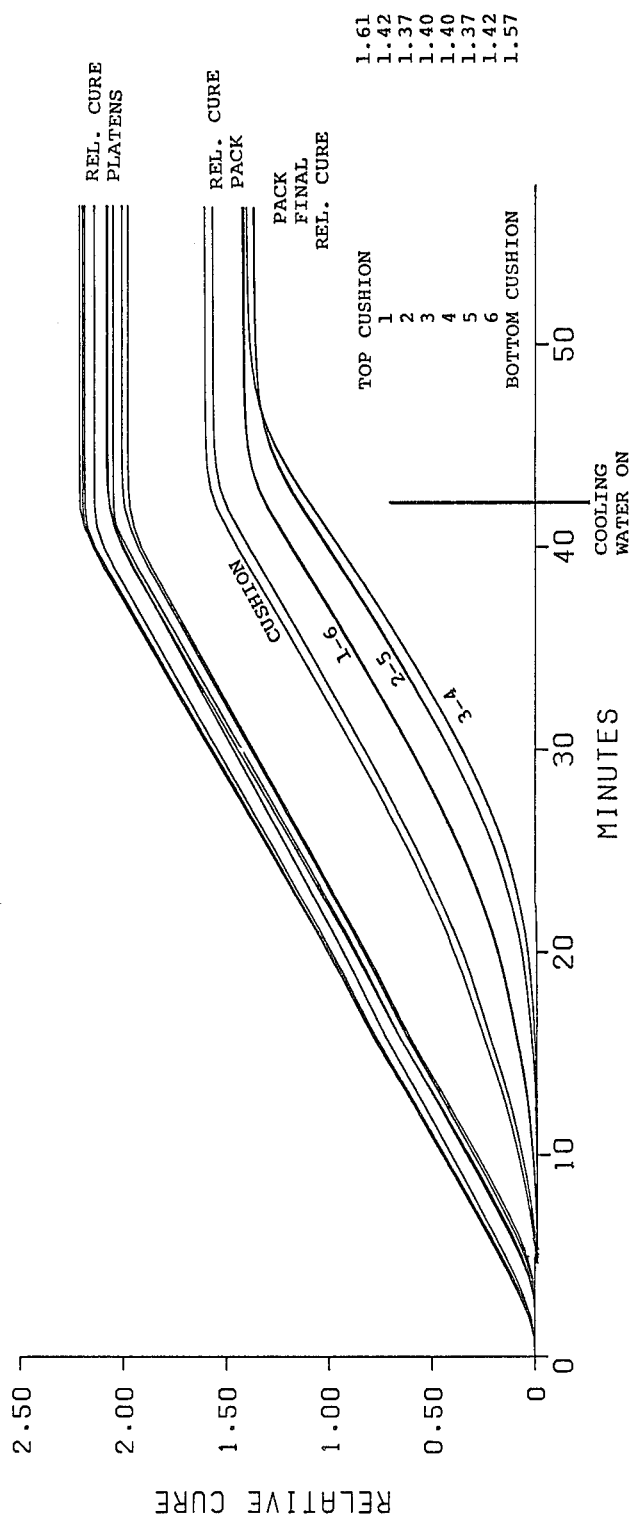

The set point programmer 40 is used to program the heating time-temperature profile that is to be imposed on the material being cured in the press. The programmed time-temperature profile is used at the set point input to the process controller 50. The set point programmer 40 controls the open or close function of blow-off valve 8 and the on or off function of the cooling water pump 20 as functions of time by means of two programming relays 42 and 43. The programmable relays are phototransistor sensors that conduct when the conductive coating of the plastic card is scraped away, as described above, allowing light from a light-emitting diode therein to energize the photo sensors, thus energizing the relays. A typical programming scheme is illustrated in FIG. 3 of U.S. Pat. No. 3,960,069.

In practice, the process controller 50 accepts the set point input from the programmer 40 and a thermocouple temperature feedback signal from thermocouple sensor 3A, located in the pack 1 being cured. It compares the error between these two signals and generates a corrective control signal provided by the proportional, integral and derivative modes of control. If desired, a second thermocouple sensor 3 may be connected to a recorder 4 for a retained record.

The signal from 50 is input to pneumatic converter or transducer 60 which converts a direct current milliampere input signal to a pneumatic control signal. The direct current input energizes a coil positioned in a permanent magnetic field thus exerting axial thrust, proportional to the direct current input signal. The axial thrust is utilized in a pneumatic/mechanical force balance which yields a pneumatic output signal, also proportional to the direct current input signal. The pneumatic control signal in turn actuates steam valve 12 to permit steam 13 to flow, through manifold 14, channels 16 in platens 2, etc. consequently controlling the temperature of pack 1 in such a manner to obtain the programmed time temperature cycle at thermocouple sensor 3A.

The combined effect is automatic operation of the steam valve 12, the blow-off valve 8 and the cooling water pump 20 in such a way as to achieve a programmed cure cycle, including an initial blow-off, heat-up and cure period and then final blow-off and cooling.

As mentioned above, the deficiencies of such a prior art system i.e. high energy usage, non-uniformity of product properties, equipment wear and tear, and condensate and contaminate blockage of piping are substantially obviated by the process of the present invention.

DESCRIPTION OF THE INVENTION INCLUDING PREFERRED EMBODIMENTS

Figure 2:
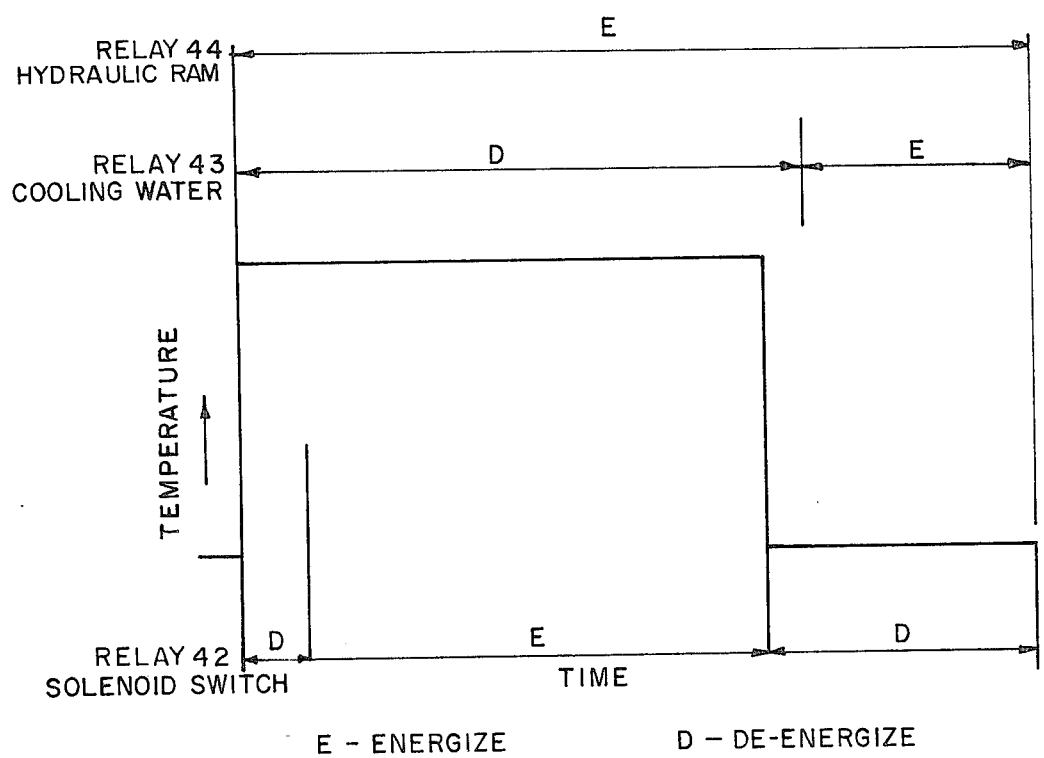
FIG. 2 represents a typical program drawn out on a card for the type of programmer 40 utilized in the present invention i.e. a computer based program by mathematical algorithms in combination with event timers. The card or mathematical algorithms contain the time-temperature cycle input to the set point controllers 50 and 51 of FIG. 1 and the corresponding programmed functions of the relays 42, 43 and 44 thereof to be executed during a press cycle.

FIG. 1 of the present invention is a diagrammatic view of the instant invention as applied to a steam heated, water cooled press. FIG. 2 is a diagrammatic view of the functions of the instant invention. The equipment used in the control scheme comprises, in combination, an electronic set point programmer 40, electronic process controller's 50 and 51 with integral and derivative modes of control, as described in U.S. Pat. No. 3,960,069 EMF to pneumatic convertors 60 and 61 and associated automated valves. The programmer 40 can be any commercially available electrostatic line following programmer as described in U.S. Pat. No. 3,960,069 combined with a programmable timer having a minimum of five programmable function switches, e.g. relays or a computer programmed with the algorithms required to describe the time temperature requirements and required time intervals for function switches, e.g. relays.

The desired program for execution of a cycle is entered into the programmer 40. The programmer 40 is used to program the time-temperature profile that is to be imposed on the material being cured in the press. The programmed time-temperature profile is used as the set point input to either process controller 50 or 51. Furthermore, the electronic set point programmable controller 40 controls the open or close functions of blow off valve 8, the open or close function of heating medium supply valve 12, the on or off function of the cooling water pump 20 as a function of time by means of a programmable relay 43 and the start, ending and maintenance of set hydraulic ram pressure recorder controller 5 to close and open the press by means of a programmable relay 42.

A typical programming scheme is illustrated in FIG. 2. The programmed electronic set point programmer 40 is started when the laminates 1 to be cured are safely in place between the platens 2 of a press. The programmer 40 energizes relay 42 which starts the hydraulic oil reservoir pump 6 which in turn closes the press to the ram pressure set point; holding same, until relay 42 is de-energized by the electronic set point programmer 40 and the press is opened. The electronic set point programmer 40 after a pre-entered time delay sends a signal to EMF to air converter 60 which opens the input of heat transfer medium supply valve 12 and also transmits a signal to relay 44 which allows the heat transfer medium temperature sensor, a pressure transmitter 11 for saturated steam, to be inputed to electronic process controller 51 and not to electronic process controller 50.

The electronic set programmer 40 then transmits the setting required for the temperature of the heat transfer medium circulating through the press to the electronic process controller 51. Electronic process controller 51 then adjusts the by-pass valve 8 through the EMF to air converter 61 to maintain the temperature set from the electronic set point programmer 40 in the heat transfer medium circulating through the press 14, 15, 16, 17, 18, 19 based on the input from the saturated steam pressure transmitter 11 utilized to sense the temperature of the medium. Upon termination of this period (designated preheat or blow-off) and controlled by a timer in the electronic set point programmer 40, the programmer 40 reverses relay 44 to change the input from the saturated steam pressure transmitter 11 to electronic process controller 50 and not to electronic process controller 51; transmits a signal to EMF to air converter 61 to close the by pass valve 8 and sets the electronic process controller 50 to the temperature required for the circulating heat transfer medium. The process controller 50 modulates the heat transfer medium entry valve 12 to obtain the temperature required by the programmer 40 through the EMF to air converter 60 based upon the input of the measured temperature of saturated steam sensed by the pressure transmitter 11 located in the input line to the circulating system of the press. When the desired set temperature has been maintained for the required period of time, a period designated cure, the electronic set point programmer 40 terminates transmissions to electronic process controllers 50 and 51, transmits a signal to EMF to air controller 60 to close the heat transfer medium entry supply valve 12 and a signal to EMF to air converter 61 to open by pass valve 8 which relieves the pressure in the heat transfer medium circulating system through the press, 14, 15, 16, 17, 18, 19. After a pre-set duration of time, programmer 40 energizes relay 43 causing cold water pump 20 to actuate to cool the press by pumping cold water through the circulating system of the press, 14, 15, 16, 17, 18, 19. When the laminates contained in the press have been cooled to the temperature required, knowledge of same obtained either by direct measurement by temperature recorder 4 or by a pre-programmed time interval, relay 43 is de-energized to stop the cooling water pump 20 and relay 42 is de-energized to stop hydraulic oil pump 6 relieving ram pressure thereby causing the press to open. The press is now ready for the unloading operation followed by the insertion of a new load and the re-start of the procedure.

I claim:
1. A method of controlling the pressing of a laminate assembly wherein the assembly is placed between heatable platens of a press which is then closed subjecting the assembly to pressure comprising:
   a. continually providing an output signal to a controller from a programmer in response to a desired time and temperature command profile,
   b. continually measuring the temperature of the heat transfer medium circulating through the heating elements of the press,
   c. continually providing said circulating temperature to said controller,
   d. continually determining the conformity of said measured temperature to the programmed temper- ature of said profile in conjunction with said time of said profile, e. continually determining a need for a temperature change in the circulating temperature from said conformity determination, f. continually providing first and second signals, each to one of a pair of relays and a third signal to a heat source from said programmer in accordance with said command profile which third signal energizes first means for introducing heating medium to the platens and which first and second signals energize second means for removing heating medium from said platens and third means for introducing cooling medium to said platens, respectively, and g. continually controlling the temperature of the heat transfer medium circulating through the heating elements in accordance with said need.

2. A method according to claim 1 wherein said output signal is provided to said controller by an electrostatic line follower, a programmed computer or a manually set regulator, all outputting the millivolts, milliamps or voltages dictated by the device utilized.

3. Apparatus for controlling a laminate assembly press comprising heatable platens which, when closed, subject said assembly to temperature and pressure, comprising:

a. programmer means for receiving and responding to a time and temperature command profile, b. controller means capable of determining the conformity of a measured temperature to a desired temperature in relation to time and the need for a change of the heating medium temperature circulating through the press, c. means for providing an output signal from said programmer means in response to said command profile to said controller means, d. means for measuring the temperature of said circulating medium and transmitting the resultant measured temperature to said controller means, e. first relay means for energizing means for removing heating medium from said press in response to said programmer, f. a second relay means for energizing means for introducing cooling medium to said platens in response to said programming means and g. means for controlling the temperature of said circulating energy in accordance with the need therefore for determined controller.

4. Apparatus according to claim 3 including line following means in said programmer means to respond to said profile.

5. Apparatus according to claim 4 including pneumatic control means for providing BTU input to said platens responsive to said controller means.

* * * * *